(12) United States Patent
Tepegoz et al.

(10) Patent No.: US 11,105,684 B2
(45) Date of Patent: Aug. 31, 2021

(54) MICROBOLOMETER STRUCTURE

(71) Applicant: MIKROSENS ELEKTRONIK SAN. VE TIC. A.S., Ankara (TR)

(72) Inventors: Murat Tepegoz, Ankara (TR); Tayfun Akin, Ankara (TR)

(73) Assignee: MIKROSENS ELEKTRONIK SAN. VE TIC.

( * ) Notice: Subject to any disclaimer, the term of this patent is extended or adjusted under 35 U.S.C. 154(b) by 499 days.

(21) Appl. No.: 16/063,214

(22) PCT Filed: Dec. 16, 2016

(86) PCT No.: PCT/IB2016/001999
§ 371 (c)(1),
(2) Date: Jun. 15, 2018

(87) PCT Pub. No.: WO2017/103683
PCT Pub. Date: Jun. 22, 2017

(65) Prior Publication Data
US 2020/0271526 A1   Aug. 27, 2020

Related U.S. Application Data

(60) Provisional application No. 62/268,291, filed on Dec. 16, 2015.

(51) Int. Cl.
*G01J 5/10* (2006.01)
*G01J 5/02* (2006.01)
*G01J 5/08* (2006.01)

(52) U.S. Cl.
CPC ............. *G01J 5/024* (2013.01); *G01J 5/0806* (2013.01)

(58) Field of Classification Search
CPC .......... G01J 5/024; G01J 5/0806; H04N 5/33; H04N 5/365; H04N 5/378; H01L 27/146
See application file for complete search history.

(56) References Cited

U.S. PATENT DOCUMENTS

2011/0248374 A1\* 10/2011 Akin ................ G01J 5/024
257/470
2013/0142215 A1\* 6/2013 Nemirovsky ............ G01J 5/02
374/121

(Continued)

FOREIGN PATENT DOCUMENTS

| CN | 103808415 | 5/2014 |
|---|---|---|
| WO | WO 2014/195185 | 12/2014 |

OTHER PUBLICATIONS

Baltes et al. "Micromachined Thermally Based CMOS Microsensors", Proceedings of the IEEE, vol. 86, No. 8, 1998, p. 1660-1678 (Year: 1998).*

(Continued)

*Primary Examiner* — David P Porta
*Assistant Examiner* — Mamadou Faye
(74) *Attorney, Agent, or Firm* — Snell & Wilmer LLP

(57) ABSTRACT

Methods, systems, and apparatus to manufacture a microbolometer detector in a standard CMOS foundry. The method includes forming a Complementary Metal Oxide Semiconductor (CMOS) wafer including a silicon substrate layer, a metal stack, a dielectric layer, and a thermoelectric conversion element embedded in the dielectric layer. The metal stack includes at least two metal layers in contact with each other. The metal stack and the dielectric layer are on the silicon substrate layer. The thermoelectric conversion element is configured to convert heat into an electrical signal. The method includes etching the metal stack to define exterior lateral edges of a microbolometer bridge including at least a portion of the dielectric layer and the thermoelectric conversion element embedded in the dielectric layer. The method includes etching the silicon substrate layer beneath the microbolometer bridge.

32 Claims, 16 Drawing Sheets

(56) References Cited

U.S. PATENT DOCUMENTS

| | | | | |
|---|---|---|---|---|
| 2014/0124671 A1* | 5/2014 | Herrmann | ............ | G01J 5/0853 |
| | | | | 250/340 |
| 2014/0175528 A1* | 6/2014 | Zieren | ................ | H01L 43/02 |
| | | | | 257/295 |
| 2014/0319350 A1* | 10/2014 | Yon | ...................... | G01J 5/20 |
| | | | | 250/338.4 |
| 2017/0025365 A1* | 1/2017 | Tin | ...................... | B29C 35/02 |

OTHER PUBLICATIONS

Henry Baltes et al; "Micromachined Thermally Based CMOS Microsensors", Proceedings of the IEEE, vol. 86, No. 8, Aug. 1, 1998.

Jiun-Chieh Liu et al.; "A CMOS Michromachined Capacitive" Sensor Array for Fingerprint Detection, IEEE Sensors Journal, vol. 12, No. 5, May 1, 2012, pp. 1004-1010.

Ming-Han Tsai et al.; "Design and Application of Metal Wet-Etching Post-Process for the Improvement of CMOS-MEMS Capacitive Sensors"; Journal of Micromechanics & Microengineering, Vo. 19, No. 10; Oct. 1, 2009, p. 105017.

Wikipedia: Surface micromachining; printed on Dec. 6, 2016; 3 pages.

Wikipedia: Bulk micromachining; printed on Dec. 6, 2016; 2 pages.

Wikipedia: Silicon micromachining; printed on Dec. 6, 2016; 6 pages.

* cited by examiner

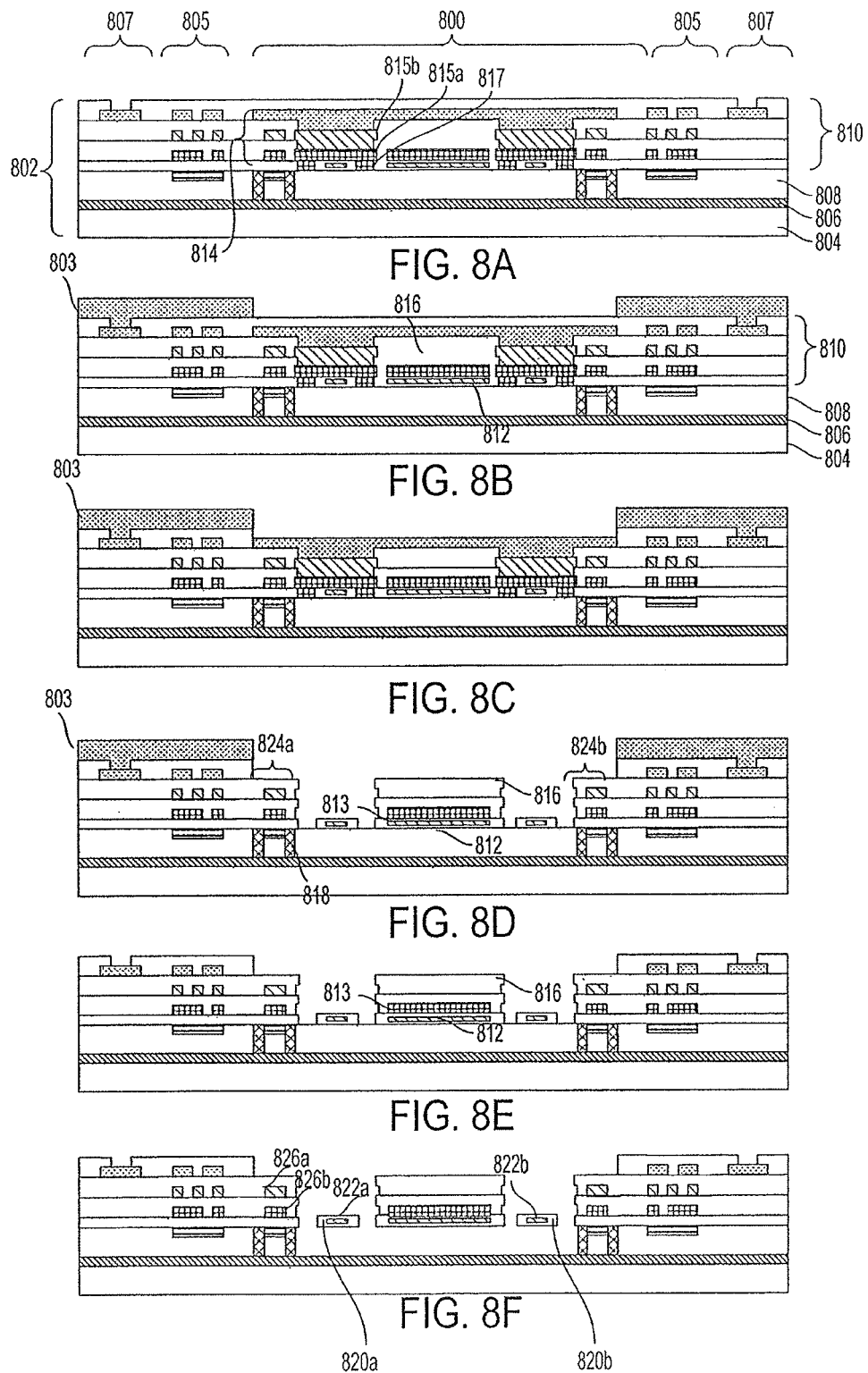

MICROBOLOMETER STRUCTURE

CROSS-REFERENCE TO RELATED APPLICATIONS

This application claims priority to and the benefit of U.S. Provisional Patent Application No. 62/268,291, entitled "MICROBOLOMETER STRUCTURE" and filed on Dec. 16, 2015, the entirety of which is hereby incorporated by reference herein.

BACKGROUND

1. Field

This specification relates to a system and method for the fabrication of a microbolometer detector.

2. Description of the Related Art

A microbolometer is a specific type of bolometer that is used as a detector for sensing mainly Long Wavelength Infrared (LWIR) radiation. A microbolometer is composed of a suspended microbolometer bridge, the pixel arms which connect the suspended microbolometer bridge to the Complementary Metal Oxide Semiconductor (CMOS) wafer substrate that the microbolometers are fabricated on, a thermoelectric conversion element that converts the heat change of the microbolometer bridge into an electrical signal, and an absorber which absorbs the infrared radiation. The absorbed radiation increases the microbolometer bridge temperature. This temperature rise is converted into an electrical signal by the thermoelectric conversion element, and this electrical parameter change is measured by the readout integrated circuit (ROIC) in order to generate an image, a video or any other form of data.

The microbolometer fabrication methods in the literature either use surface micromachining which contains fabricating thin film layers on top of a substrate, or bulk micromachining which contains fabrication steps of etching or removing away some parts of the substrate in order to form the microbolometer.

SUMMARY

In general, one aspect of the subject matter described in this specification is embodied in a method for manufacturing a microbolometer detector. The methods described in this patent use mostly standard CMOS layers or components in order to form the microbolometers as opposed to most methods in the literature where specially tuned layers are used to form the microbolometer physical structure and the thermoelectric conversion element. The methods in this patent aim to use a standard CMOS wafer and have simple Micro-Electromechanical Systems (MEMS) processes after CMOS fabrication in order to fabricate the microbolometers, so that the overall fabrication is simple, fast compatible with mass fabrication foundries (such as CMOS foundries), and low cost.

These methods in this patent use bulk CMOS wafers or Silicon-on-Insulator Complementary Metal Oxide Semiconductor (SOI-CMOS) wafers as the substrate. The metal layers in the CMOS process are intentionally shaped in order to form the microbolometer structure. The metal layers may be used either as sacrificial layers or hard MEMS masks for this purpose. When used as a sacrificial layer, it is possible to have high fill factor microbolometer structures. After a standard CMOS fabrication, simple MEMS processes are required to fabricate the microbolometers. The suspended microbolometer bridge is formed by etching away a certain part of the silicon wafer. The methods in this patent may use anisotropic or isotropic silicon etching and may implement one or more etch-stops with the CMOS layers.

The method in this patent includes forming a Complementary Metal Oxide Semiconductor (CMOS) wafer including a silicon substrate layer, a metal stack, a dielectric layer, and a thermoelectric conversion element embedded in the dielectric layer. The metal stack includes at least two metal layers in contact with each other. The metal stack and the dielectric layer are on the silicon substrate layer. The thermoelectric conversion element is configured to convert heat into an electrical signal. The method includes etching the metal stack to define exterior lateral edges of a microbolometer bridge including at least a portion of the dielectric layer and the thermoelectric conversion element embedded in the dielectric layer. The method includes etching the silicon substrate layer beneath the microbolometer bridge.

These and other embodiments may optionally include one or more of the following features. The method may include etching the silicon substrate layer to form at least one pixel arm in which a conductive layer is embedded for carrying the electrical signal, and to form at least one wall structure between the microbolometer detector and an adjacent microbolometer detector. The at least one wall structure may decrease thermal crosstalk between the microbolometer detectors. The wall structure may include routing metals for carrying electric signals.

The thermoelectric conversion element may include at least one of a metal layer, a metal seed layer, a polysilicon layer, a silicide layer, any CMOS technology layer that may be used as a resistor, one or more transistors, one or more diodes, any CMOS technology active or passive components, or a non-CMOS technology layer deposited during/within CMOS fabrication or after CMOS fabrication.

The microbolometer bridge may include a mirror structure configured to reflect infrared light. The mirror may be embedded in the dielectric layer above the thermoelectric conversion element, below or on a same level as the thermoelectric conversion element. The microbolometer may include at least one plasmonic structure embedded in the dielectric layer. The at least one plasmonic structure may be configured to increase absorption of infrared light in the microbolometer bridge or filter absorption of infrared light in the microbolometer bridge.

The metal stack may include a first metal layer and a second metal layer. The second metal layer may be on top of the first metal layer and laterally offset from the first metal layer. The second metal layer may be laterally offset from the first metal layer so that a first exterior lateral edge of the microbolometer bridge defined by etching the first metal layer is laterally closer to a center of the microbolometer bridge than a second exterior lateral edge of the microbolometer bridge defined by etching the second metal layer. The second metal layer may be laterally offset from the first metal layer so as to increase a fill factor of the microbolometer detector.

The metal stack may include a metal layer on the dielectric layer. Etching the metal stack may include etching the metal layer on the dielectric layer to define a first interior lateral edge of the microbolometer bridge that is formed by the dielectric layer and may be opposite an exterior lateral edge of the microbolometer bridge so as to decrease a thermal mass and a thermal time constant of the microbolometer detector.

In another aspect, the subject matter is embodied in a method for manufacturing a microbolometer detector. The method includes forming a CMOS wafer including a substrate layer, a dielectric layer on an active silicon layer or the substrate layer, a thermoelectric conversion element embedded in the dielectric layer. The thermoelectric conversion element may be configured to convert heat into an electrical signal. The at least one metal layer may have a predetermined shape for use as a mask during at least one post-CMOS MEMS process. The method may include etching the dielectric layer to reach an active silicon layer or the substrate layer with the at least one metal layer acting as an etch stopper or mask. The method may include etching the active silicon layer or substrate layer to form a microbolometer bridge including a portion of the dielectric layer and the thermoelectric conversion element embedded in the dielectric layer.

In another aspect, the subject matter is embodied in a method for manufacturing a microbolometer detector. The method may include forming a CMOS wafer including a substrate layer, a metal stack including at least two metal layers in contact with each other, a dielectric layer, and a thermoelectric conversion element embedded in the dielectric layer. The thermoelectric conversion element may be configured to convert heat into an electrical signal. The method may include etching the metal stack to define exterior lateral edges of a microbolometer bridge including at least a portion of the dielectric layer and the thermoelectric conversion element embedded in the dielectric layer. The method may include etching at least a portion of an active silicon layer or substrate layer beneath the microbolometer bridge.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 8A-8F illustrate cross-sectional views of an example SOI-CMOS wafer being fabricated into a microbolometer detector formed by the process of FIG. 7 according to an aspect of the invention.

DETAILED DESCRIPTION

Disclosed herein are systems, structures and methods for fabricating microelectromechanical systems (MEMS), such as microbolometers. Particular embodiments of the subject matter described in this specification may be implemented to realize one or more of the following advantages.

A method for fabricating MEMS devices, such as microbolometer detectors, uses Complementary Metal-Oxide-Semiconductor (CMOS) wafers and facilities to simplify the fabrication process of microbolometer detectors. By using current CMOS facilities and CMOS wafers to fabricate the microbolometers, the fabrication method is genericized and does not require specialized resources, such as dedicated clean rooms or dedicated CMOS foundry lines. This reduces manufacturing costs and allows for mass production of large quantities of microbolometers. By eliminating the need for dedicated clean rooms or dedicated CMOS foundry lines as part of the fabrication process and forming the microbolometers from CMOS wafers, the fabrication process allows for the use of existing CMOS facilities and CMOS wafers to implement the fabrication process to form the microbolometer devices, and, thus, reduces manufacturing costs, reduces manufacturing time and increases mass production of the microbolometer devices.

Other benefits and advantages include using a metal sacrificial layer to simplify the etching process and allow for uniformity. Additionally, the use of a metal sacrificial layer allows the microbolometer to be easily shaped. By simplifying the etching process and shaping the microbolometer, the microbolometer is able to achieve a high fill factor. This allows the microbolometer to collect more power and makes it possible to shrink the pixel size.

Figure 1:
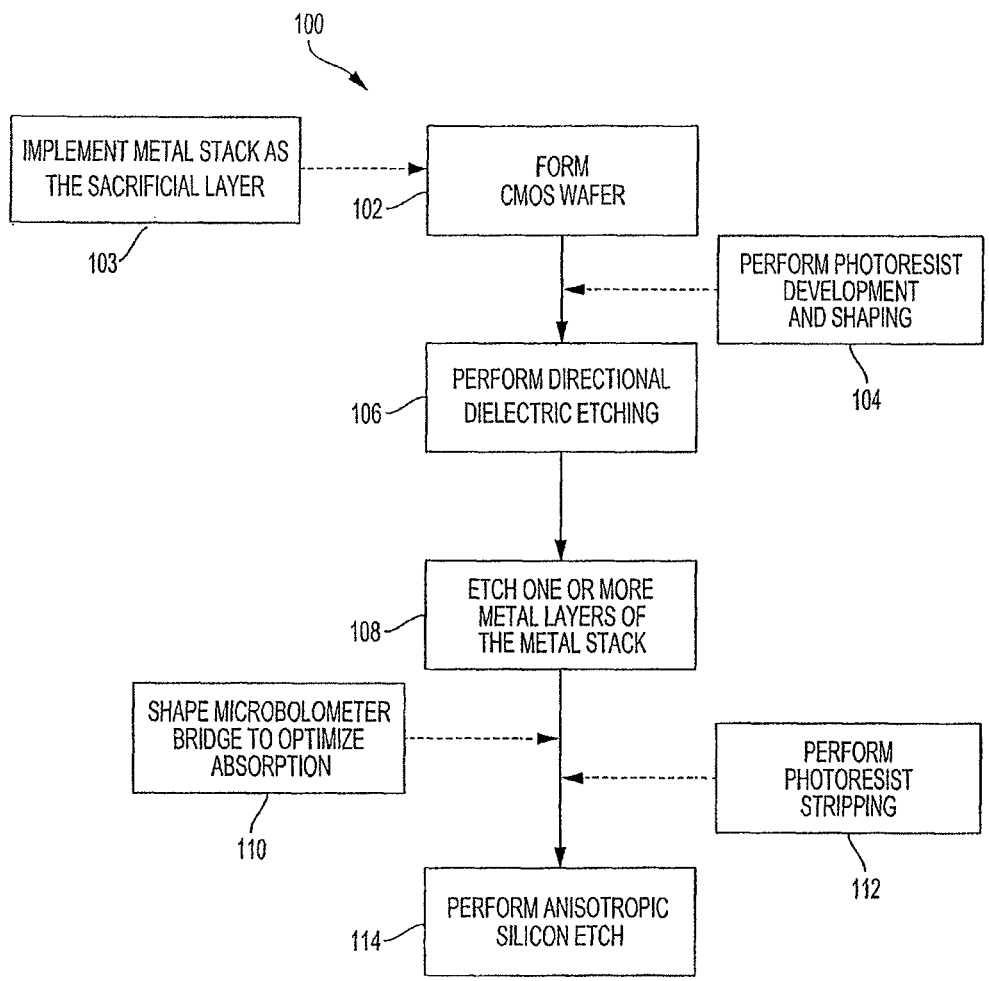
FIG. 1 is a flow diagram of an example process for fabricating a microbolometer detector using one or more metal sacrificial layers according to an aspect of the invention.

FIG. 1 is an example process 100 for fabricating the microbolometer detector using one or more metal sacrificial layers. A CMOS fabrication system ("fabrication system") may implement the process 100 to form the microbolometer detector 200. The microbolometer detector 200 includes a microbolometer bridge 212, one or more pixel arms 214a-b, a thermoelectric conversion element 208 or an active material and an absorber. Each microbolometer detector 200 may correspond with a pixel in an image or video.

Figure 2A:
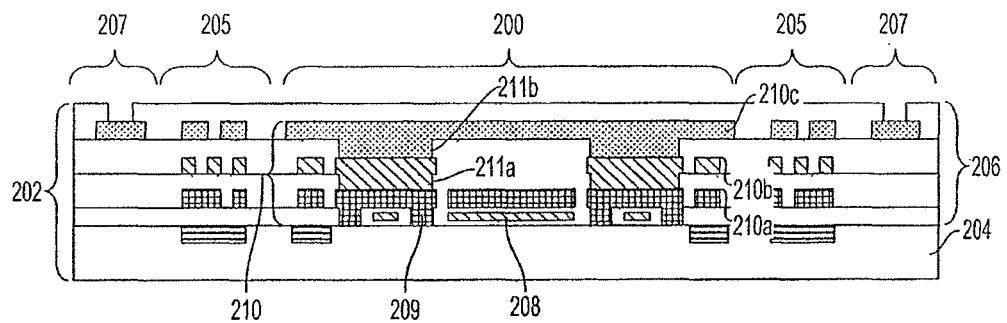
FIGS. 2A-2F illustrate cross-sectional views of an example Complementary Metal-Oxide-Semiconductor (CMOS) wafer being fabricated into the microbolometer detector formed by the process of FIG. 1 according to an aspect of the invention.

The fabrication system forms a complementary metal oxide semiconductor wafer (CMOS) 202 (102). FIG. 2A illustrates a cross-sectional view of the CMOS wafer 202. The CMOS wafer 202 has a substrate layer 204, a metal stack 210, a dielectric layer 206 and a thermoelectric conversion element 208. The substrate layer 204 may be made of silicon. The metal stack 210 and/or dielectric layer 206 may be formed on the substrate layer 204. The dielectric layer 206 may be on top of the substrate layer 204.

The metal stack 210 includes at least two metal layers 210a-c in contact with each other, a contact (CONT) layer 209 and one or more vertical interconnect access (VIA) layers 211a-c. The at least two metal layers that are in contact with each other may be connected to one another via VIA layers 211a-c. The metal stack 210 may be in contact with the substrate layer 204 via the CONT layer 209. The fabrication system may implement the metal stack 210 as sacrificial layers that are etched out to shape the microbolometer bridge 212, the one or more pixel arms 214a-b and/or the wall structures 218a-b (103). The at least two metal layers may include a first metal (MET1) layer 210a, a second metal (MET2) layer 210b, a third metal (MET3) layer 210c and/or a fourth metal (MET4) layer 210d. One or more metal layers of the metal stack 210 may be formed on the dielectric layer 206. The dielectric layer 206 may be on top of the substrate layer 204. The metal layer that is on top of the other metal layers may be referred to as a metal top (METTP) layer.

Figure 3A:
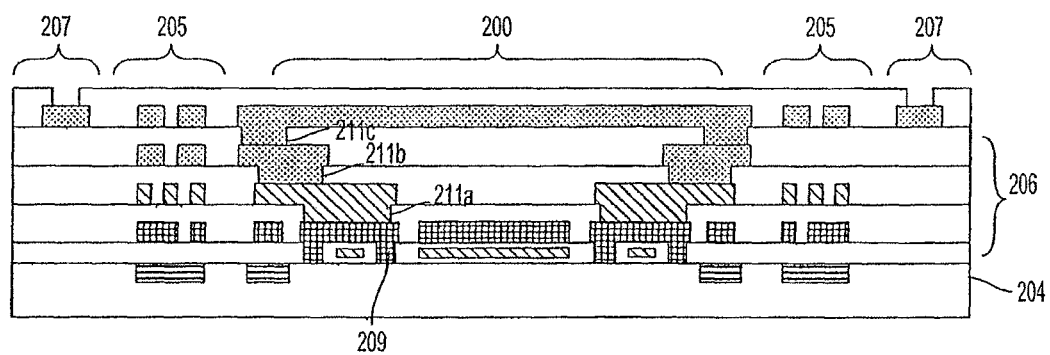
FIGS. 3A-3B illustrate cross-sectional views of an example microbolometer detector formed by the process of FIG. 1 having an umbrella-shape according to an aspect of the invention.

The MET1 210a and CONT layer 209 are in physical contact with the substrate layer 204. The MET2 210b and MET1 210a layers are connected to each other using the first vertical interconnect access (VIA1) layer 211a. The MET3 210c and MET2 210b layers are connected with the second vertical interconnect access (VIA2) layer 211b. A third vertical interconnect access (VIA3) layer 211c may connect the MET3 210c and MET4 210d layers. FIG. 3A illustrates a cross-sectional view of a CMOS wafer 202 that includes the MET4 layer to be etched to form the umbrella shape 302.

The dielectric layer 206 of the microbolometer detector 200 may be formed on the substrate layer 204. The dielectric layer 206 may be made from silicon nitride ($Si_3N_4$) or silicon oxide (SiO). The dielectric layer 206 may include a passivation layer or an inter-metal-oxide (IMO) layer.

The microbolometer detector 200 may have a thermoelectric conversion element 208. The thermoelectric conversion element 208 may be embedded in the dielectric layer 206 and may be configured to convert heat into an electrical signal.

The thermoelectric conversion element 208 may be an active or passive component. It may be a CMOS resistance, such as a metal resistance, poly resistance, silicide poly resistance, seed metal layer resistance, or any other resistor layer that could be included in the CMOS process. The thermoelectric conversion element 208 may have one or more transistors, one or more diodes or any CMOS technology component. The thermoelectric conversion element 208 may also be a non-CMOS technology thin-film layer deposited during/within CMOS fabrication or after CMOS fabrication.

Figure 2B:
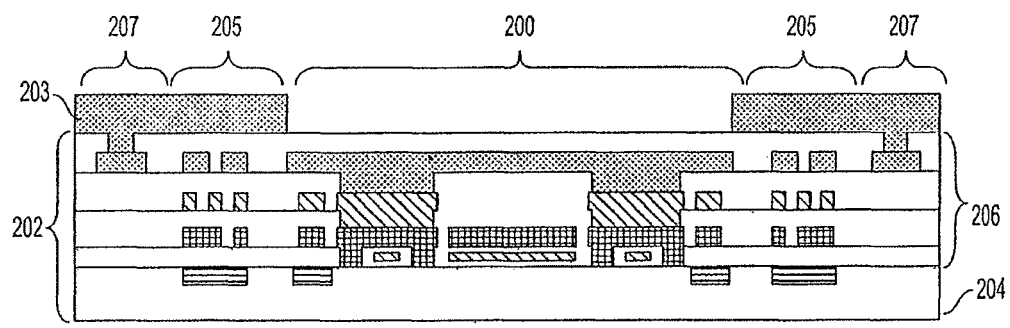

The fabrication system may perform photoresist development and shaping (104). FIG. 2B illustrates the CMOS wafer 202 after photoresist development and shaping. The fabrication system may deposit a photoresist 203 or a similar material on top of the formed CMOS wafer 202 on the regions, such as the electronics 205 and/or electrical pads 207, surrounding the microbolometer detector 200 to cover the regions other than the microbolometer detector 200. The photoresist 203 prevents etching of the electronics 205 and metal layer of the electrical pads 207 in the CMOS wafer 202.

Figure 2C:
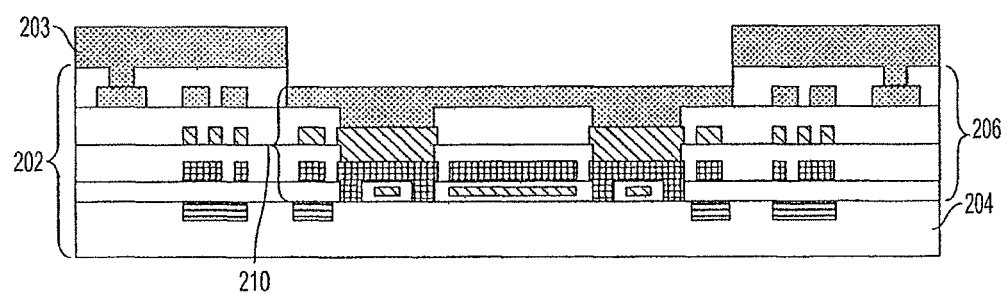

The fabrication system may perform advanced oxide etching or directional dielectric etching to remove or etch away the dielectric layer 206 on top of the metal stack 210 (106). FIG. 2C illustrates the CMOS wafer 202 after advanced oxide etching. For example, the fabrication system may use flat reactive-ion etching to remove portions of the dielectric layer 206, such as the passivation layer, the inter metal oxide (IMO) layer and/or other portions of the dielectric layer 206 that are deposited on the metal stack 210 and/or substrate layer 204.

Figure 2D:
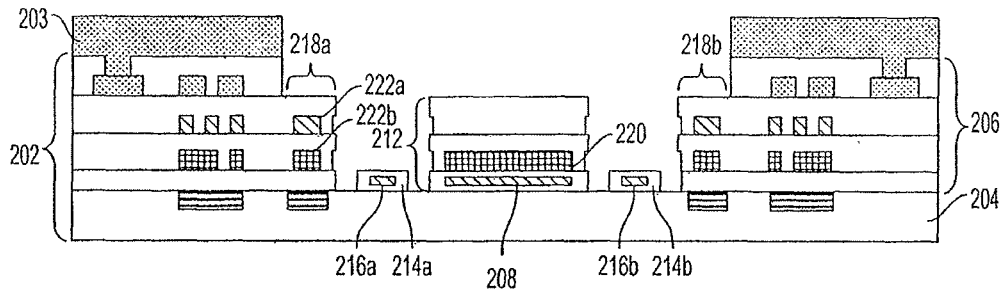

The fabrication system etches away one or more metal layers, the one or more VIA layers 211a-c and/or the CONT layer 209 of the metal stack 210 (108). FIG. 2D illustrates the CMOS wafer 202 that has been metal etched. The one or more metal layers 210, the one or more VIA layers 211a-c, such as the VIA1 and VIA2 layers 211a-b, and/or the CONT layer 209 are used as sacrificial layers that are etched to form a microbolometer bridge 212, one or more pixel arms 214a-b in which one or more conductive layers 216a-b are embedded for carrying an electrical signal and one or more wall structures 218a-b between the microbolometer detector 200 and an adjacent microbolometer. The fabrication system may use a wet or dry metal etch. The one or more metal layers of the metal stack 210 may be etched in a single metal etching process.

The fabrication system etches away the metal stack 210 to define exterior lateral edges of a microbolometer bridge 212. The microbolometer bridge 212 includes at least a portion of one or more metal layers and a portion of the dielectric layer 206. One or more portions of the one or more metal layers in the microbolometer bridge 212 may form the thermoelectric conversion element 208 and/or the mirror 220.

When etching away portions of the metal stack 210, the fabrication system may optimize and/or adjust the width of the one or more metal layers of the metal stack 210 that form the microbolometer bridge 212, the one or more pixel arms 216a-b and/or the wall structures 218a-b. The width of the microbolometer bridge 212 is indirectly correlated with the width of the one or more conductive layers 216a-b within the one or more pixel arms 214a-b. The shape of the pixel arms 214a-b and the one or more conductive layers 216a-b directly correlate with the thermal conductivity of the microbolometer detector 200.

When the microbolometer bridge 212 absorbs the infrared (IR) radiation, the temperature of the microbolometer bridge 212 increases. The thermoelectric conversion element 208, e.g., the active material, acts as a temperature sensor that senses and/or measures the temperature rise as the IR radiation is absorbed by the microbolometer bridge 212. The resistance of the active material correlates with the change in temperature. That is, the resistance of the active material changes as the temperature increases. By determining the change in resistance, the microbolometer detector 200 provides information about the amount of infra-red (IR) radiation absorbed by the pixels of the microbolometer detector 200.

The microbolometer detector 200 may use one of the one or more metal layers within the microbolometer bridge 212 as a mirror 220 to reflect IR radiation to increase the absorption ratio of the IR radiation. For example, the absorption ration may increase from 40% to 60%. The mirror 220 may be embedded within the dielectric layer 206 of the microbolometer bridge 212, and may be positioned above, below or on the same level as the thermoelectric conversion element 208. If the IR absorption of the one or more dielectric layers 206 in the microbolometer bridge 212 is high enough, the mirror 220 may not be necessary and may be omitted.

Figure 2E:
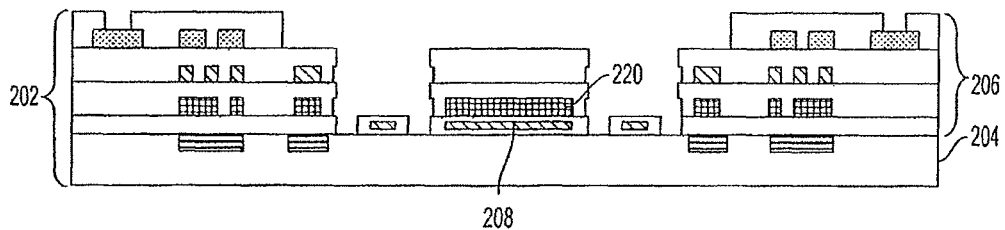
Figure 2F:
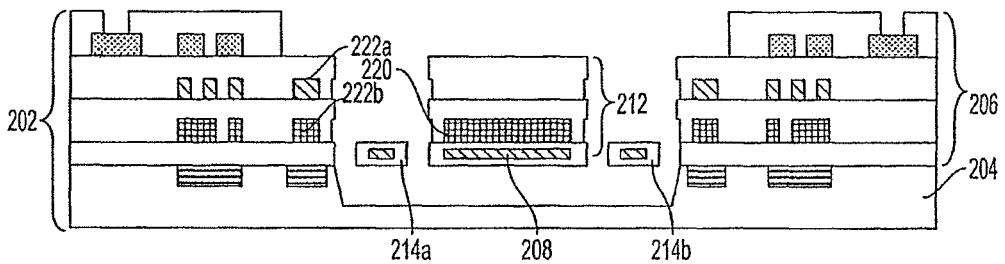
Figure 2G:
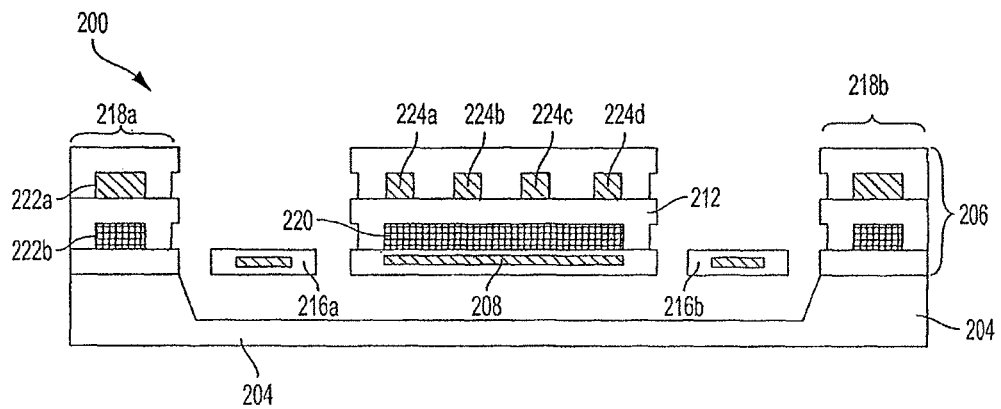
FIG. 2G illustrates a cross-sectional view of an example microbolometer detector formed by the process of FIG. 1 with one or more plasmonic structures according to an aspect of the invention.

The microbolometer detector 200 may use one or more metal layers as one or more plasmonic structures 224a-d to increase the absorption of the IR radiation. The one or more plasmonic structures 224a-d may be embedded within the dielectric layer 206 of the microbolometer bridge 212. FIG. 2G illustrates a cross-sectional view of a microbolometer detector 200 having one or more plasmonic structures 224a-d. The one or more plasmonic structures 224a-d may increase the absorption of the IR radiation and/or filter the IR radiation to specific wavelengths. The one or more plasmonic structures 224a-d may be of various shapes that tune the absorption characteristics of the microbolometer bridge 212. The shape of the one or more plasmonic structures 224a-d may be adjusted to increase or decrease the absorption of the IR radiation and/or tune the absorption characteristics of the microbolometer bridge 212. For example, the microbolometer bridge 212 may absorb IR radiation of a particular, such as wavelengths of 8 micrometers.

The one or more pixel arms 214a-b connect the microbolometer bridge 212 to the wall structures 218a-b of the microbolometer detector 200. The wall structures 218a-b of the microbolometer detector 200 are formed from the dielectric layer 206 and have one or more metal layers embedded within the dielectric layer 206 to form routing metals 222a-b. The routing metals 222a-b electrically connect the microbolometer detector 200 to another device, e.g., another microbolometer detector or semi-conductor device, such as readout electronics.

Figure 3B:
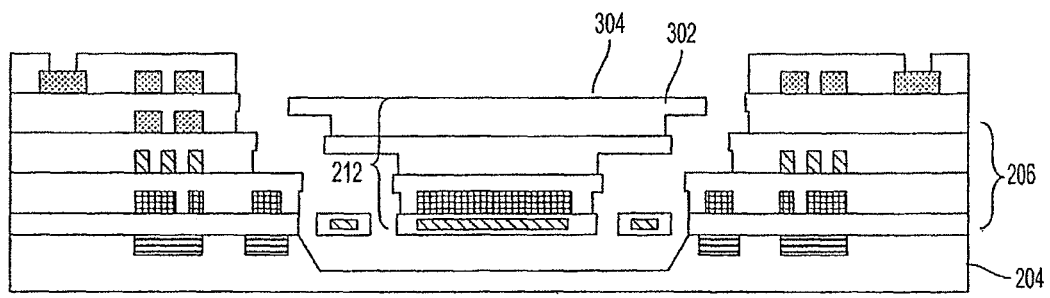

In some implementations, the fabrication system may etch the one or more metal layers to optimize the shape of the microbolometer bridge 212 to increase or decrease total absorption of the IR radiation or fill factor of the pixel (110). FIG. 3A illustrates a cross-sectional view of a CMOS wafer 202 to be formed into an umbrella-shaped microbolometer detector 200. The fabrication system may etch a first metal layer 210a to define a first exterior lateral edge of the microbolometer bridge 212 and etch a second metal layer 210b that is on top of the first metal layer to define a second exterior lateral edge of the microbolometer bridge 212. The fabrication system may etch the first metal layer 210a and the second metal layer 210b so that the first exterior lateral edge of the microbolometer bridge 212 is offset from the second metal exterior lateral edge of the microbolometer bridge 212 to form the microbolometer bridge 212 into an umbrella shape 302. The umbrella shape increases the surface area of the top surface 304 of the microbolometer bridge 212. The increase of the surface area 304 of the microbolometer bridge 212 results in an increase in the fill factor of the microbolometer detector 200. FIG. 3B illustrates a cross-sectional view of an umbrella-shaped microbolometer detector 200.

Figure 4A:
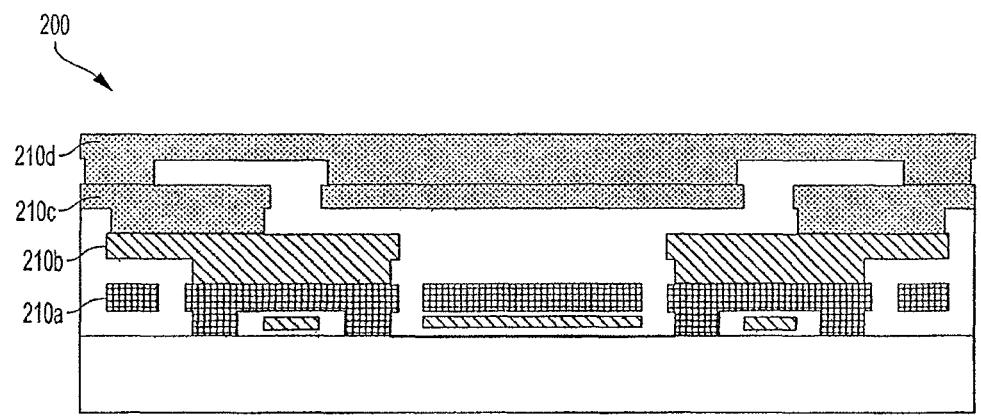
FIGS. 4A-4B illustrate cross-sectional views of an example microbolometer detector formed by the process of FIG. 1 having a cavity defined within the umbrella-shaped microbolometer bridge according to an aspect of the invention.
Figure 4B:
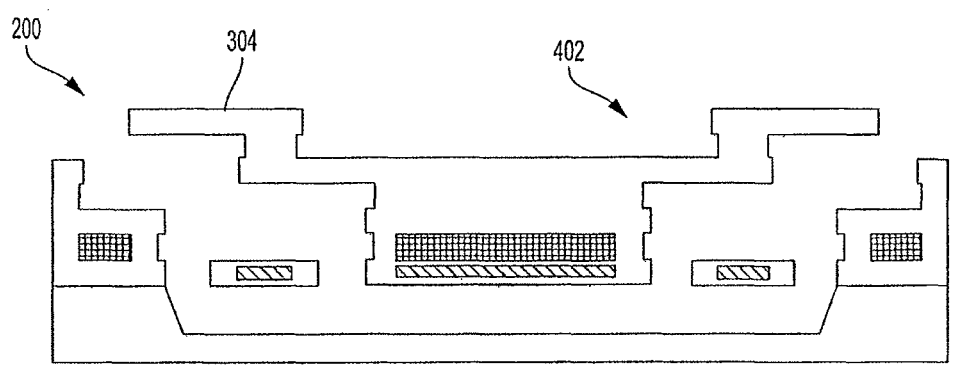

FIGS. 4A-B illustrate a microbolometer detector 200 having a cavity 402 formed to adjust the thermal mass and/or thermal time constant of the microbolometer detector 200. The fabrication system may etch a metal layer 210d that may be on the dielectric layer 206 to adjust the thermal mass and/or thermal time constant of the microbolometer detector 200 by reducing the volume of the microbolometer bridge 212 (110). FIG. 4A illustrates a microbolometer detector 200 with a fourth metal layer (MET4) 210d that is etched to adjust the thermal mass and/or thermal time constant.

By etching the fourth metal layer 210d, the fabrication system defines a cavity 402 within the microbolometer bridge 212. FIG. 4B illustrates a microbolometer detector 200 having a cavity 402. The fabrication system may etch the metal layer 210d to define a first interior lateral edge of the microbolometer bridge 212. The first interior lateral edge is opposite the exterior lateral edge of the microbolometer bridge 212. The fabrication system may etch the metal layer 210d to decrease the thermal mass and the thermal time constant of the microbolometer detector 200. The thermal time constant is a measure of the speed of a detector, such as the microbolometer detector 200. The thermal time constant directly correlates with the volume and indirectly correlates with the speed of the microbolometer detector 200. That is, as the volume of the microbolometer detector 200 decreases, e.g., by etching a cavity 402 within the microbolometer bridge 212, the thermal time constant decreases and the speed of the microbolometer detector 200 increases.

The fabrication system may perform photoresist stripping to remove any remaining photoresist 203 that covers the electronics 205 and/or pads 207 (112). FIG. 2E illustrates a cross-sectional view of the CMOS wafer 202 after the photoresist 203 is removed.

The fabrication system performs anisotropic silicon etching to etch away the substrate layer 204 beneath the microbolometer bridge (114). FIG. 2F illustrates a cross-sectional view of the formed microbolometer detector 200. The fabrication system performs anisotropic silicon etching to etch the substrate layer 204 beneath the microbolometer bridge 212 to release or suspend the microbolometer bridge 212 above the substrate layer 204. The substrate layer 204 beneath the microbolometer bridge 212 is etched away using an anisotropic silicon etchant, such as tetramethlyammonium hydroxide (TMAH) or potassium hydroxide (KOH).

Figure 5:
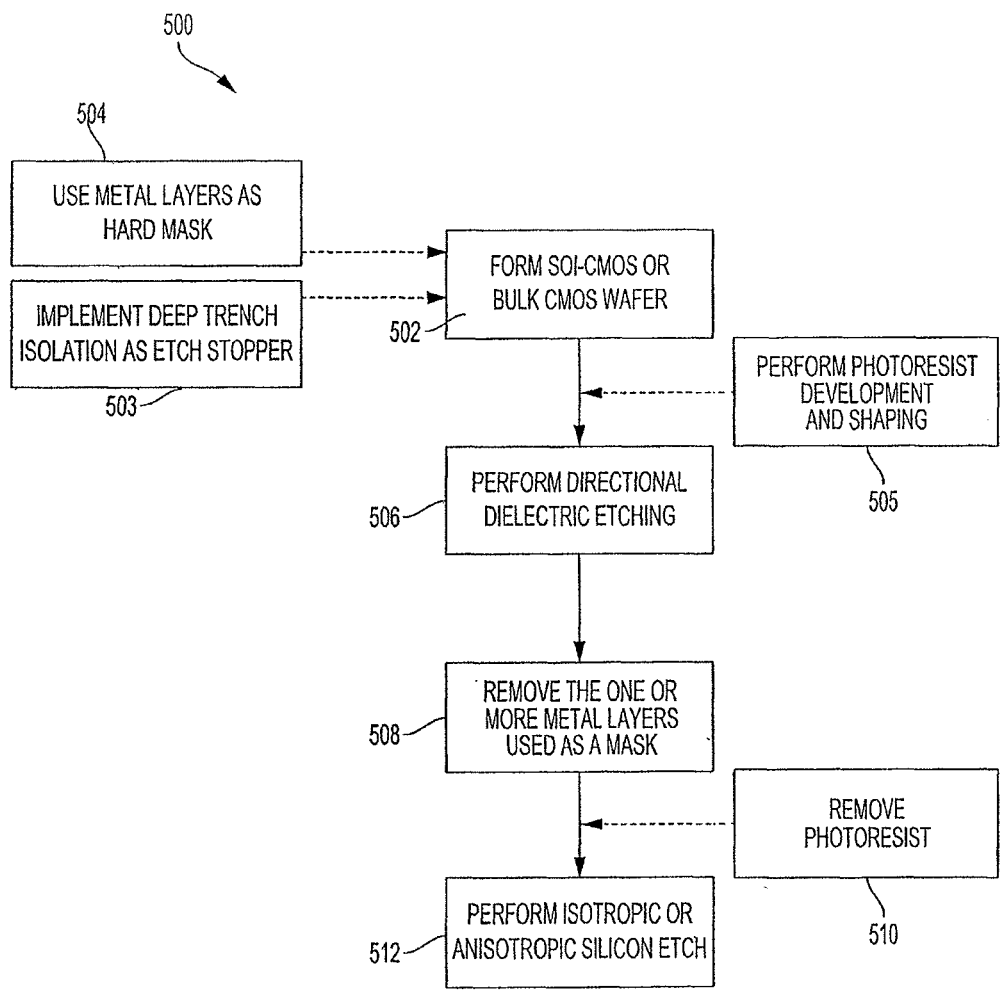
FIG. 5 is a flow diagram of an example process for fabricating a microbolometer detector using one or more metal layers as a mask according to an aspect of the invention.

FIG. 5 is an example process 500 for fabricating the microbolometer detector 600 using one or more metal layers as a mask. A fabrication system may implement the process 500 to form the microbolometer detector 600.

Figure 6A:
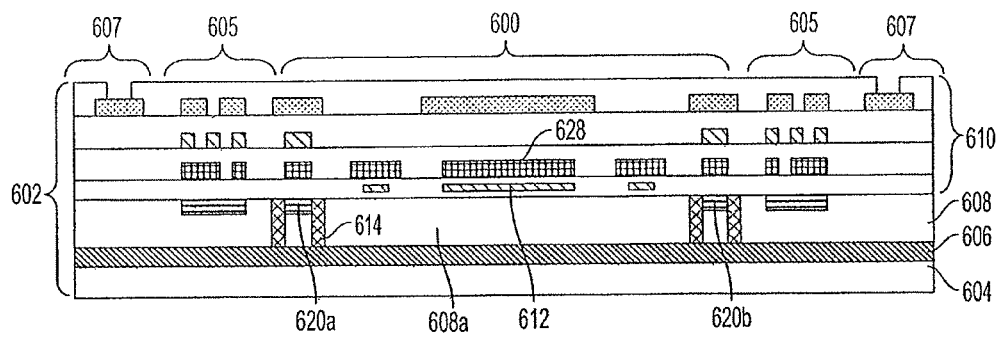
FIGS. 6A-6E illustrate cross-sectional views of an example Silicon-on-Insulator (SOI) complementary metal oxide semiconductor (CMOS) wafer being fabricated into the microbolometer detector formed using the process of FIG. 5 according to an aspect of the invention.

The fabrication system may form a SOI-CMOS 602 or CMOS wafer 601 (502). The SOI-CMOS wafer 602 may have a substrate layer 604, such as a handle silicon substrate, an insulating layer 606, an active layer 608, a dielectric layer 610, a thermoelectric conversion element 612 and at least one metal layer 622*a-c*. FIG. 6A illustrates a cross-sectional view of the SOI-CMOS wafer 602 used to form the microbolometer detector 600.

Figure 6B:
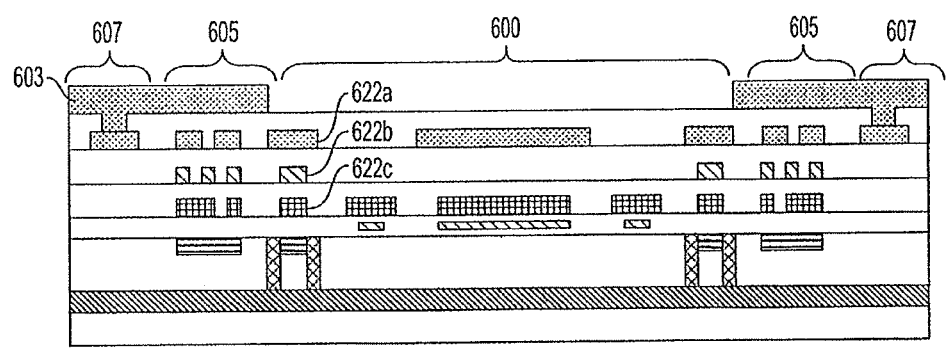
Figure 6C:
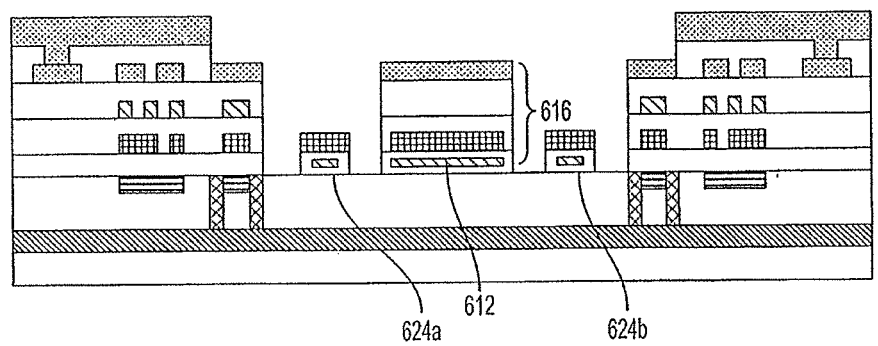
Figure 6D:
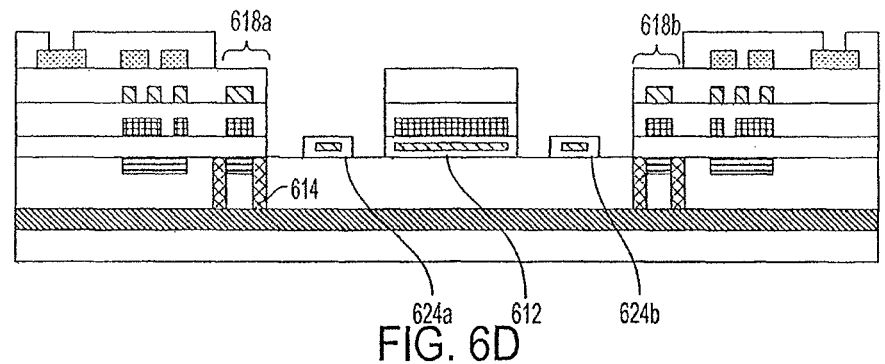
Figure 6E:
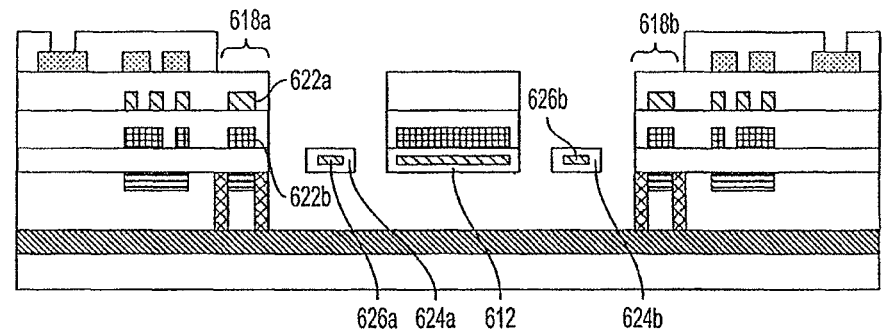
Figure 6F:
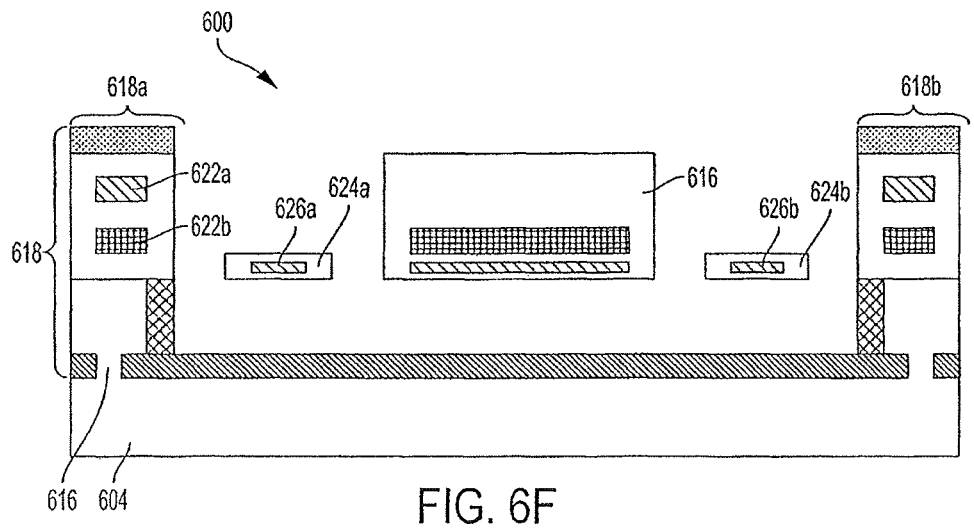
FIG. 6F illustrates a cross-sectional view of an example microbolometer detector formed by the process of FIG. 5 having at least one Handle Wafer Contact (HWC) according to an aspect of the invention.

The insulating layer 606 may be formed on top of the substrate layer 604, and the active layer 608 may be made of silicon and formed on top of the insulating layer 606. The insulating layer 606 may be a buried oxide (BOX) layer formed on top of the substrate layer 604. The insulating layer 606 may include at least one opening where at least one Handle Wafer Contact (HWC) 616 is positioned inside the opening. The HWC 616 connects the active layer 608 with the substrate layer 604 to provide temperature stabilization of the microbolometer detector 600. FIG. 6F illustrates a cross-sectional view of the microbolometer detector 600 having two HWCs.

The active layer 608 may be formed on top of the insulating layer 606. The dielectric layer 610 may be formed on the active layer 608 or the substrate layer 604 and have the thermoelectric conversion element 612 embedded within. The fabrication system may implement a deep trench isolation structure 614 within the active layer 608 or substrate layer 604 (503). The fabrication system may implement the one or more metal layers 622*a-c* as a hard mask during a post-CMOS micro-Electrical-Mechanical Systems (MEMS) process (504). The one or more metal layers 622*a-c* may have a predetermined shape. The one or more metal layers 622*a-c* may be on portions of the dielectric layer 610, and the fabrication system may etch away portions of the dielectric layer 610 that are not masked or covered by the one or more metal layers 622*a-c*. Portions of the dielectric layer 610 covered by the one or more metal layers 622*a-c* remain after the etching process.

Figure 6G:
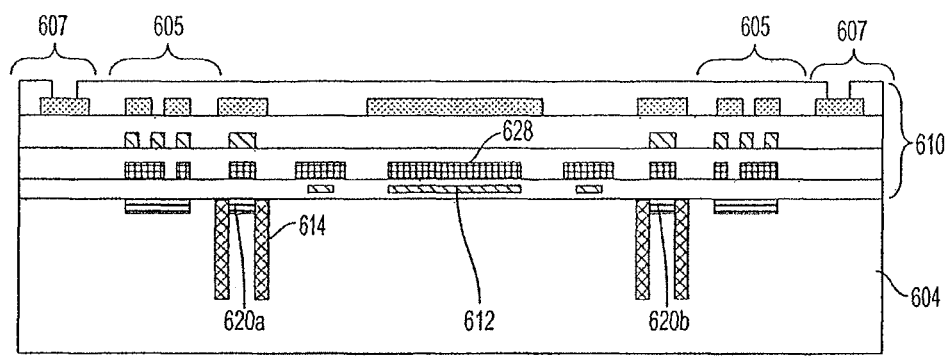
FIGS. 6G-6H illustrate cross-sectional views of an example CMOS wafer being fabricated into a microbolometer detector using the process of FIG. 5 according to an aspect of the invention.

The CMOS wafer 601 may have a substrate layer 604, a dielectric layer 610, a thermoelectric conversion element 612 and one or more metal layers 622*a-c*. The dielectric layer 610 is formed on top of the substrate layer 604, and the one or more metal layers 622*a-c* may be used to mask or prevent masking of the one or more pixel arms 624*a-b*, the one or more wall structures 618*a-b* and the microbolometer bridge 616. FIG. 6G illustrates a cross-sectional view of the CMOS wafer 601 used to form the microbolometer detector 600.

The fabrication system may perform photoresist development and shaping on top of the SOI-CMOS wafer 602 or the CMOS wafer 601 (505) to prevent etching of the electronics 605 and/or pads 607 by depositing a photoresist 603 or similar material on regions other than the microbolometer detector 600. FIG. 6B illustrates a SOI-CMOS wafer 602 after a photoresist 603 has been deposited.

The fabrication system performs directional dielectric etching or advanced oxide etching of the dielectric layer 610 to reach the active layer 608, when a SOI-CMOS is used, or substrate layer 604, when a CMOS wafer is used (506). FIG. 6C illustrates the SOI-CMOS wafer 602 after the fabrication system has etched away the dielectric layer 610 vertically to reach the active layer 608. When a SOI-CMOS wafer 602 is used, the fabrication system etches the dielectric layer 610 to reach the active layer 608. The active layer 608 may have an insulator layer, such as a DTI structure 614, embedded within that isolates the active layer 608*a* beneath the microbolometer bridge 616 and pixel arms from other portions of the active layer 608. The active layer 608*a* beneath the microbolometer bridge 616 and the pixel arms are physically isolated from the other parts of the active layer 608 in every dimension such that the DTI structure 614 also encloses the active layer 608*a* on top.

When a CMOS wafer 601 is used, the fabrication system etches the dielectric layer 610 to reach the substrate layer 604, and the DTI structure 614 is embedded within the substrate layer 604.

The DTI structure 614 may act as an etch stopper during etching of the active layer 608 or substrate layer 604. The other portions of the active layer 608 or substrate layer 604 that are in the wall structures 618*a-b* may include circuitry 620 of which is isolated from the active layer 608 or substrate layer 104 beneath the microbolometer bridge 616 by the DTI structure 614.

The one or more metal layers 622*a-c* are used as a mask in the SOI-CMOS wafer 602 or the CMOS wafer 601 to shield or prevent the advanced oxide etching from etching the layers beneath the mask.

The fabrication system removes the metal layers 622*a-c* that are used as a mask (508). The fabrication system may perform photoresist stripping to remove any remaining photoresist 603 that covers the electronics 605 and/or pads 607 (51Q). FIG. 6D illustrates the SOI-CMOS wafer 602 after the metal layers 622*a-b* that were used as a mask are removed and the photoresist 603 is stripped.

Figure 6H:
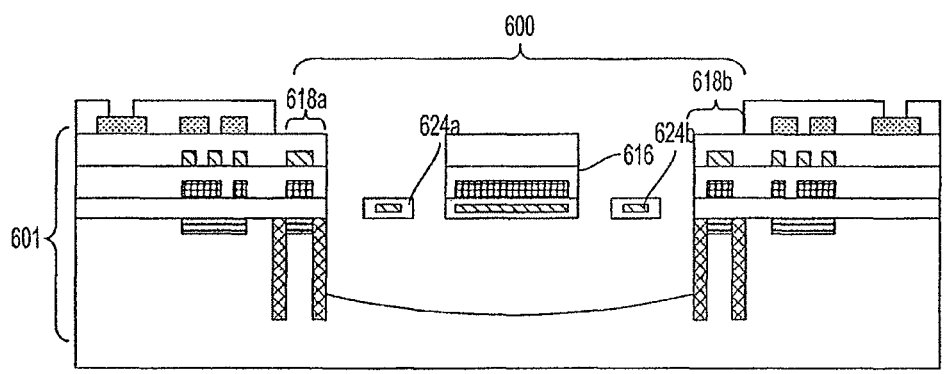

The fabrication system performs isotropic or anisotropic silicon etching to etch the active layer 608, when a SOI-CMOS wafer 602 is used, or the substrate layer 604, when a CMOS wafer 601 is used (512). FIG. 6E illustrates a cross-sectional view of the microbolometer detector 600 formed from the SOI-CMOS wafer 602 where the silicon is etched using isotropic etching. FIG. 6H illustrates a cross-sectional view of the microbolometer detector 600 formed from the CMOS wafer 601. The isotropic silicon etching forms the microbolometer bridge 616 including a mirror 628 and/or the thermoelectric conversion element 612 embedded in the dielectric layer 610(514). The isotropic silicon etching may be a dry or wet etch and may be uniform on all angles.

By etching the active layer 608*a* or substrate layer 604, the microbolometer bridge 616 is suspended above the insulating layer 608 and/or substrate layer 604. That is, the fabrication system may define a base region beneath the microbolometer bridge 616. The base region may include a remaining portion of the active layer 608 or substrate layer 604 with the embedded DTI structure 614 acting as an etch stopper.

The fabrication system may use xenon diflouride (XeF$_2$) or similar isotropic etchants, such as sulfur hexaflouride (SF$_6$) to etch the active layer 608*a* or substrate layer 604 so that tetramethylammonium hydroxide (TMAH), potassium hydroxide (KOH) or similar anisotropic etchants are not required. The DTI structure 614 and insulating layer 606 allows the use of the dry silicon etch process and bulk manufacturing to form the microbolometer detector 600.

The fabrication system may etch the active layer 608*a*, when a SOI-CMOS wafer 602 is used, or substrate layer 604, when a CMOS wafer 601 is used, to form at least one pixel arm 624*a-b* in which a conductive layer 626*a* or 626*b* is embedded for carrying the electrical signal. The fabrication system may etch the active layer 608*a*, when a SOI-CMOS wafer 602 is used, or substrate layer 604, when a CMOS wafer 601 is used, to form at least one wall structure 618 between the microbolometer detector 600 and other microbolometer detectors to provide thermal isolation between the microbolometer detectors (510). The wall structure 618 may include routing metals 630*a-b* for carrying electric signals and/or circuitry 620*a-b*.

Figure 7:
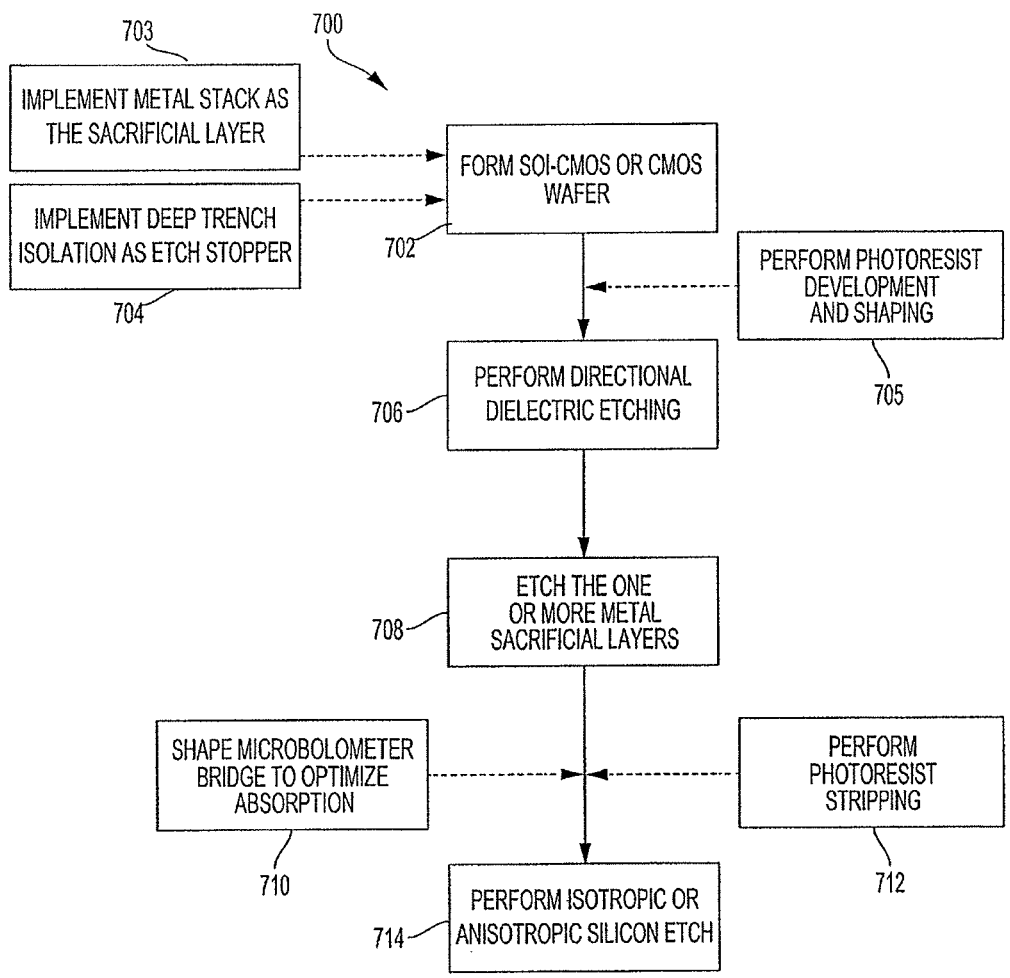
FIG. 7 is a flow diagram of an example process for fabricating a microbolometer detector using one or more metal layers as sacrificial layers and one or more Deep Trench Isolation (DTI) structures according to an aspect of the invention.

FIG. 7 is an example process 700 for fabricating the microbolometer detector 800. A fabrication system may implement the process 700 to form the microbolometer detector 800 of FIG. 8C. FIGS. 8A-8F show a cross-sectional view of the microbolometer detector 800 formed from a SOI-CMOS wafer 802 or a CMOS wafer 801.

The fabrication system forms a SOI-CMOS 802 or CMOS wafer 801 (702). The SOI-CMOS wafer 802 has a substrate layer 804, such as a handle silicon substrate, an insulating layer 806, an active layer 808, a dielectric layer 810, a thermoelectric conversion element 812 and a metal stack 814. FIG. 8A illustrates a cross-sectional view of the SOI-CMOS wafer 802.

Figure 11:
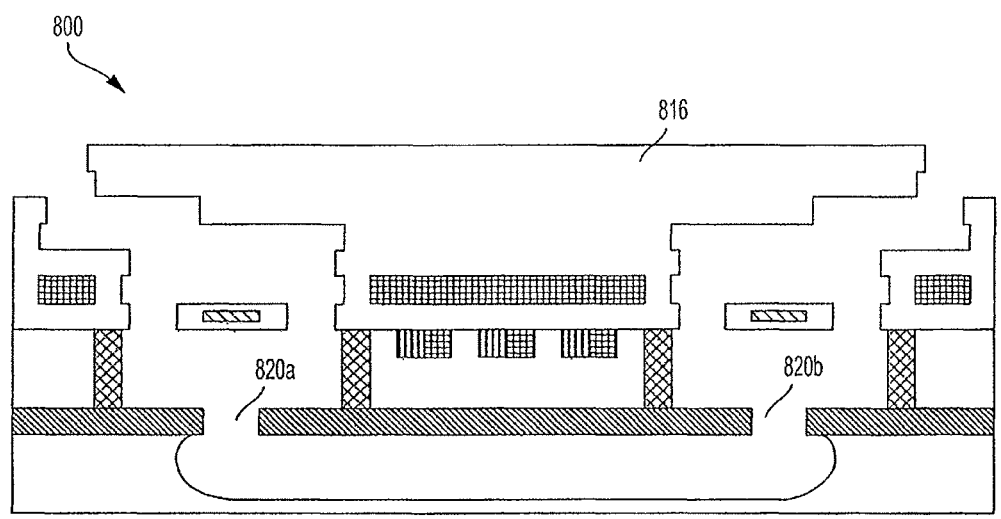
FIG. 11 illustrates a cross-sectional view of an example microbolometer detector formed by the process of FIG. 7 having at least one Handle Wafer Contact (HWC) according to an aspect of the invention.

The insulating layer 806 may be formed on top of the substrate layer 804, and the active layer 808 may be made of silicon and formed on top of the insulating layer 806. The insulating layer 806 may be a buried oxide (BOX) layer formed on top of the substrate layer 804. The insulating layer 806 may include at least one gap and at least one HWC 820*a* or 820*b* inside a corresponding gap of the at least one gap that connects the active silicon layer 808 with the substrate layer 804. FIG. 11 illustrates a cross-sectional view of the microbolometer detector 800 made from a SOI-CMOS wafer 802 and having at least two HWCs 820*a-b*.

The metal stack 814 may include at least two metal layers 814*a-c* in contact with each other. The at least two metal layers 814*a-c* that are in contact with each other may be connected to one another via one or more VIA layers 815*a-b* and in contact with the active layer via CONT layer 817. The VIA layers 815*a-b* and CONT layer 817 may be used as sacrificial layers that are etched out to shape the microbolometer bridge 816. One or more metal layers 814*a-c* may be on top of and/or laterally offset of another metal layer so that an exterior edge is laterally closer to a center of the microbolometer bridge 816 than another exterior lateral edge.

Figure 8G:
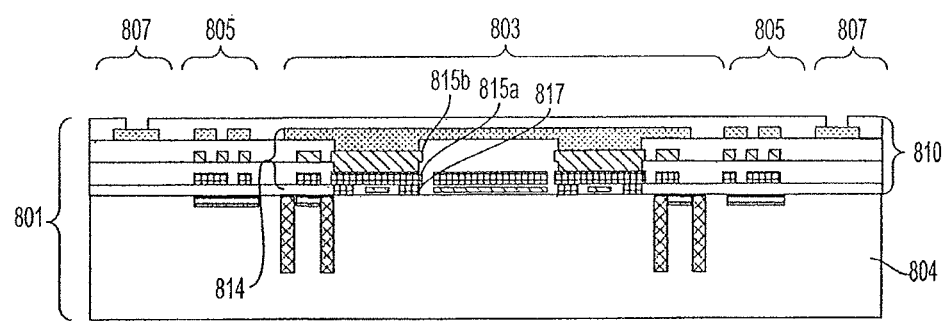
FIGS. 8G-8H illustrate cross-sectional views of an example CMOS wafer being fabricated into a microbolometer detector using the process of FIG. 7 according to an aspect of the invention.

The CMOS wafer 801 may have a substrate layer 804, a dielectric layer 810, a thermoelectric conversion element 812 and a metal stack 814. The dielectric layer 610 is formed on top of the substrate layer 604, and the metal stack 814 may be used as sacrificial layers. FIG. 8G illustrates a cross-sectional view of the CMOS wafer 801 used to form the microbolometer detector 800.

The fabrication system may implement the metal stack 814 as sacrificial layers when forming either the SOI-CMOS wafer 802 or CMOS wafer 801 (703). The fabrication system may implement an insulator layer, such as deep trench isolation (DTI) structure 818, within the active layer 808, when a SOI-CMOS wafer 802 is used, or within the substrate layer 804, when a CMOS wafer 801 is used (704).

The fabrication system may perform photoresist development and shaping on top of the SOI-CMOS wafer 802 or the CMOS wafer 801 (705) to prevent etching of the electronics 805 by depositing a photoresist 803 or similar material on regions other than the microbolometer detector 800. FIG. 8B illustrates the SOI-CMOS wafer 802 after photoresist development and shaping.

The fabrication system may perform advanced oxide etching to etch away portions of the dielectric layer 812 including a passivation layer (706). FIG. 8C illustrates the SOI-CMOS wafer 802 after etching away portions of the dielectric layer 812.

The fabrication system may etch away the metal stack 814 to define exterior lateral edges of the microbolometer bridge 816 including at least a portion of the dielectric layer and the thermoelectric conversion element 812 and/or mirror 813 embedded in the dielectric layer (708). FIG. 8D illustrates a cross-sectional view of SOI-CMOS wafer 802 after the portions of the metal stack 814 used as sacrificial layers are etched away.

Figure 9A:
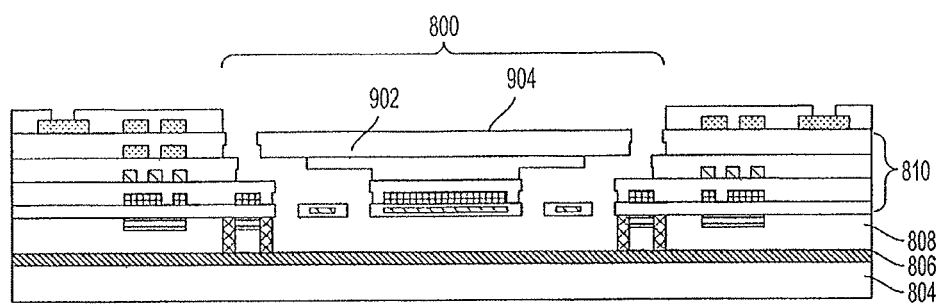
FIG. 9A illustrates a cross-sectional view of an example microbolometer detector of FIG. 8F having an umbrella-shape according to an aspect of the invention.
Figure 9B:
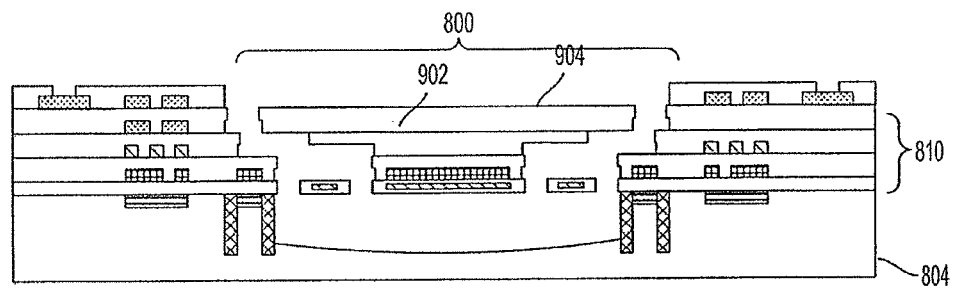
FIG. 9B illustrates cross-sectional view of the microbolometer detector of FIG. 8H having an umbrella-shape according to an aspect of the invention.

The fabrication system may etch the metal stack 814 to optimize the shape of the microbolometer bridge 816 (710). The fabrication system may etch away the metal stack 814 to form the microbolometer bridge 816 into an umbrella shape 902. FIG. 9A illustrates a cross-sectional view of the microbolometer detector 800 formed from the SOI-CMOS wafer 802 in an umbrella shape 902. FIG. 9B illustrates a cross-sectional view of the microbolometer detector 800 formed from the CMOS wafer 801 in an umbrella shape 902. The umbrella shape 902 increases the surface area of the top surface 904 of the microbolometer bridge 816 which results in an increased fill factor for the microbolometer detector 800. The steps of etching away the metal stack 814 and optimizing the shape of the microbolometer bridge 814 are similar to steps 106 and 108, respectively.

Figure 10:
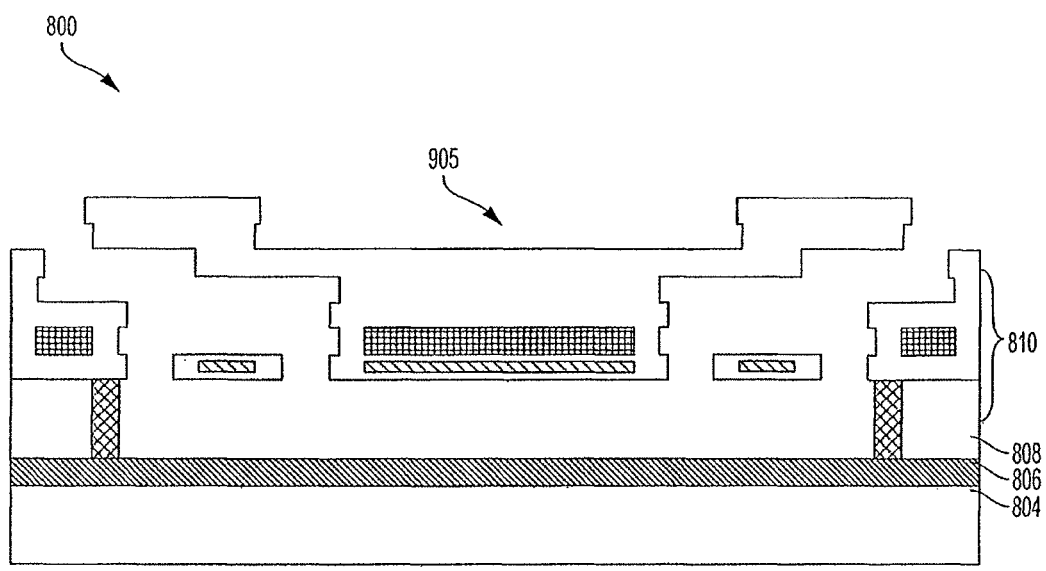
FIG. 10 illustrates a cross-sectional view of an example microbolometer detector having a cavity defined within the umbrella-shaped microbolometer bridge according to an aspect of the invention.

FIG. 10 illustrates a microbolometer detector 800 with an umbrella shape 902 and having a cavity 905 formed by etching one or more metal layers to adjust the thermal mass and/or thermal time constant of the microbolometer detector 800. The metal stack 814 may have a metal layer on the dielectric layer 810. By etching the metal layer, the fabrication system defines a cavity 905 within the microbolometer bridge 816. The fabrication system may etch the metal layer to define a first interior lateral edge of the microbolometer bridge 816. The first interior lateral edge is opposite the exterior lateral edge of the microbolometer bridge 816.

The fabrication system may perform photoresist stripping to remove any remaining photoresist 803 that covers the electronics 805 and/or pads 807 after etching away the metal sacrificial layers (712). FIG. 8E illustrates a SOI-CMOS wafer 802 after the remaining photoresist 803 has been removed.

Figure 8H:
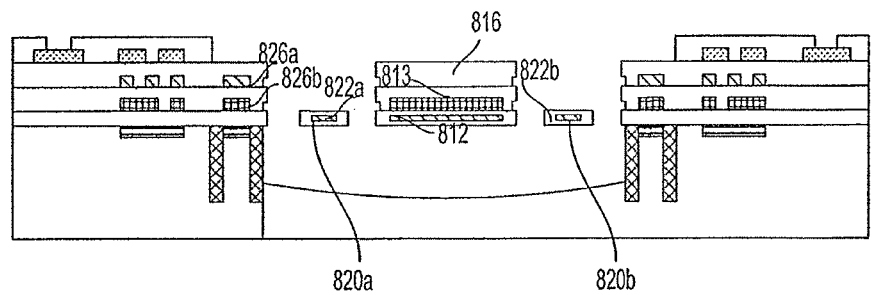

The fabrication system performs isotropic or anisotropic silicon etching to etch at least a portion of the active layer 808, when a SOI-CMOS wafer 802 is used, or substrate layer 804, when a CMOS wafer 801 is used, beneath the microbolometer bridge 816 (714). FIG. 8F illustrates a microbolometer detector 800 formed from the SOI-CMOS wafer 802. FIG. 8H illustrates a microbolometer detector 800 formed from the CMOS wafer 801.

The fabrication system performs the isotropic or anisotropic silicon etching to suspend the microbolometer bridge 816 above the insulating layer 806 and/or the substrate layer 804. By etching the active layer 808 or substrate layer 804, the fabrication system defines a base region beneath the microbolometer bridge 816. The active layer 808, when a SOI-CMOS wafer 802 is used, or substrate layer 804, when a CMOS wafer 801 is used, may have an insulator layer, such as a deep trench isolation (DTI) structure 818.

Figure 12:
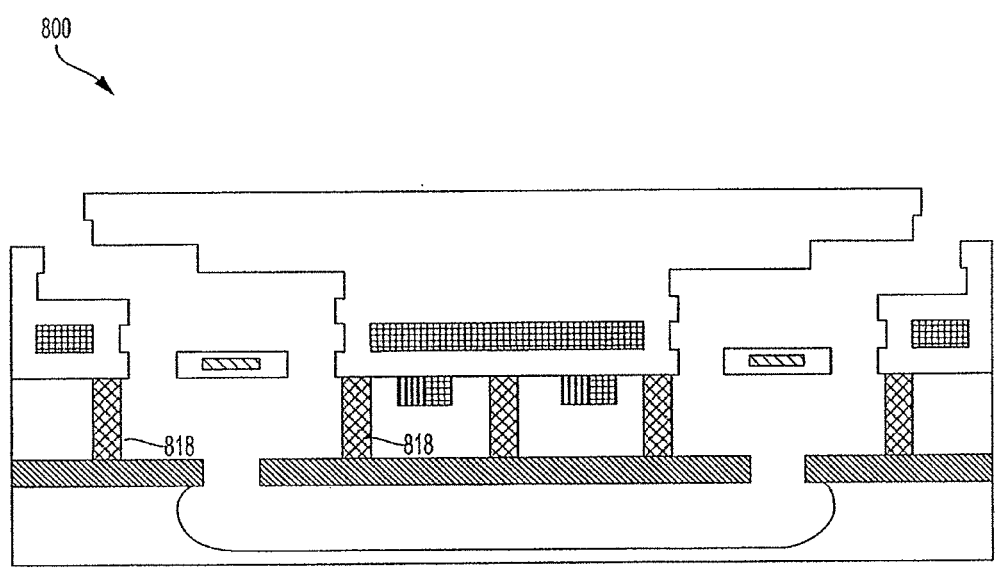
FIG. 12 illustrates cross-sectional view of an example microbolometer detector having a plurality of DTI structures according to an aspect of the invention.

The active layers or substrate layers of the differently formed microbolometer detectors may have multiple DTI structures, such as DTI structures 818 of the microbolometer detector 800, embedded within that isolates the active layer or substrate layer beneath the microbolometer bridge from other portions of the active layer or substrate layer. FIG. 12 illustrates a cross-sectional view of a microbolometer detector 800 having multiple DTI structures 818. The one or more DTI structures 818 act as an etch stopper and may define multiple silicon regions in the base region beneath the microbolometer bridge 816.

The fabrication system may perform isotropic silicon etching to etch the active layer 806, when a SOI-CMOS wafer 802 is used, or substrate layer 804, when a CMOS wafer 801 is used, to form at least one pixel arm 820*a-b* in which a conductive layer 822*a* or 822*b* is embedded for carrying the electrical signal and/or at least one wall structure 824*a-b* between the microbolometer detector 800 and an adjacent microbolometer detector. The wall structure 824*a* or 824*b* may provide thermal isolation between the microbolometer detectors and include routing metals 826*a-b* for carrying electrical signals. The steps of etching away the active layer 808 to form the suspended microbolometer bridge 816 and the at least one pixel arms 820*a-b* is similar to steps 506 and 508, respectively.

In some implementations, the fabrication system may perform anisotropic silicon etching to etch the active layer 806, when a SOI-CMOS wafer 802 is used to form the microbolometer detector 800 having at least two HWCs 820*a-b*, e.g., the microbolometer detector 800 of FIG. 11.

Exemplary embodiments of the methods/systems have been disclosed in an illustrative style. Accordingly, the terminology employed throughout should be read in a non-limiting manner. The named components may have similar characteristics as the similarly named components mentioned throughout. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for manufacturing a microbolometer detector, the method comprising:
    forming a Complementary Metal Oxide Semiconductor (CMOS) wafer including a silicon substrate layer, a metal stack on the silicon substrate layer including at least two metal layers in contact with each other, a dielectric layer on the silicon substrate layer, and a thermoelectric conversion element embedded in the dielectric layer, the thermoelectric conversion element configured to convert heat into an electric signal;
    etching the metal stack to define exterior lateral edges of a microbolometer bridge including at least a portion of the dielectric layer and the thermoelectric conversion element embedded in the dielectric layer;
    dry etching the silicon substrate layer beneath the microbolometer bridge from a front side of the silicon substrate layer; and
    dry etching the silicon substrate layer from the front side to form at least one pixel arm in which a conductive layer is embedded for carrying the electrical signal and to form at least one wall structure between the microbolometer detector and an adjacent microbolometer detector to provide thermal isolation between the microbolometer detectors.

2. The method of claim 1, wherein the wall structure includes routing metals for carrying electric signals.

3. The method of claim 1, wherein the thermoelectric conversion element includes at least one of a metal layer, a metal seed layer, a polysilicon layer, a silicide layer, a silicided polysilicon layer, any CMOS technology layer, one or more transistors, one or more diodes, or any CMOS technology active or passive components.

4. The method of claim 1, wherein the thermoelectric conversion element includes at least one of a non-CMOS technology layer, such as amorphous silicon, vanadium oxide, vanadium tungsten oxide, silicon-germanium, titanium oxide, or Yttrium Barium Copper oxide, deposited during or within CMOS fabrication or after CMOS fabrication, wherein the thermoelectric electric conversion unit is fabricated before a metal layer or on top of the metal layers.

5. The method of claim 1, wherein the at least two metal layers of the metal stack are etched using a metal etching process.

6. The method of claim 1, wherein the microbolometer bridge further includes a mirror structure configured to reflect infrared light and embedded in the dielectric layer above the thermoelectric conversion element, below the thermoelectric conversion element, or on a same level as the thermoelectric conversion element.

7. The method of claim 6, wherein the microbolometer bridge includes at least one plasmonic structure embedded in the dielectric layer and made by at least one CMOS metal layer, the at least one plasmonic structure configured to increase absorption of infrared light in the microbolometer bridge or filter absorption of infrared light in the microbolometer bridge.

8. The method of claim 1, wherein the metal stack includes a first metal layer and a second metal layer that is on top of the first metal layer and laterally offset from the first metal layer so that a first exterior lateral edge of the microbolometer bridge defined by etching the first metal layer is laterally closer to a center of the microbolometer bridge than a second exterior lateral edge of the microbolometer bridge defined by etching the second metal layer so as to increase a fill factor of the microbolometer detector.

9. The method of claim 1, wherein the metal stack includes a metal layer on the dielectric layer, and wherein etching the metal stack further includes etching the metal layer on the dielectric layer to define a first interior lateral edge of the microbolometer bridge that is formed by the dielectric layer and is opposite an exterior lateral edge of the microbolometer bridge so as to decrease a thermal mass and a thermal time constant of the microbolometer detector.

10. A method for manufacturing a microbolometer detector, the method comprising:
    forming a Complementary Metal Oxide Semiconductor (CMOS) wafer including a substrate layer, a dielectric layer on an active silicon layer or the substrate layer, a thermoelectric conversion element embedded in the dielectric layer, the thermoelectric conversion element configured to convert heat into an electric signal, and at least one metal layer having a predetermined shape for use as a mask during at least one post-CMOS (Micro Electro-Mechanical Systems) MEMS process;
    etching the dielectric layer to reach an active silicon layer or the substrate layer with the at least one metal layer acting as an etch stopper or mask; and
    dry etching the active silicon layer or substrate layer from a front side to form a microbolometer bridge including a portion of the dielectric layer and the thermoelectric conversion element embedded in the dielectric layer.

11. The method of claim 10, wherein the CMOS wafer is a Silicon-on-Insulator (SOI) CMOS wafer that includes an insulating layer on top of the substrate layer and an active silicon layer on top of the insulating layer, wherein the substrate layer is a handle silicon substrate, wherein the active silicon layer is etched to form the microbolometer bridge.

12. The method of claim 11, further comprising etching the active silicon layer to form at least one pixel arm in which a conductive layer is embedded for carrying the electrical signal, and to form at least one wall structure between the microbolometer detector and an adjacent microbolometer detector to provide thermal isolation between the microbolometer detectors, the wall structure including routing metals for carrying electric signals.

13. The method of claim 12, wherein the at least one wall structure includes circuitry in addition to the at least one routing metal.

14. The method of claim 11, wherein the SOI-CMOS wafer includes a DTI structure on the insulating layer and embedded in the active silicon layer beneath the microbolometer bridge so as to separate portions of the active silicon substrate layer, and wherein etching the active silicon layer defines a base region beneath the microbolometer bridge including the DTI structure and a remaining portion of the active silicon layer with the DTI structure acting as an etch stopper.

15. The method of claim 11, wherein the insulating layer includes at least one gap and the SOI-CMOS wafer includes at least one Handle Wafer Contact (HWC) inside a corresponding gap of the least one gap that connects the active silicon layer with the handle silicon substrate for temperature stabilization of the microbolometer detector.

16. The method of claim 10, wherein the CMOS wafer includes a Deep Trench Isolation (DTI) structure to isolate the active silicon layer or substrate layer beneath the microbolometer from other parts of the active silicon layer or substrate layer, respectively.

17. The method of claim 14, wherein the DTI structure acts as a silicon etch stopper during etching of the active silicon layer or substrate layer.

18. The method of claim 10, wherein the thermoelectric conversion element includes at least one of a metal layer, a metal seed layer, a polysilicon layer, a silicide layer, a silicided polysilicon layer, any CMOS technology layer, one or more transistors, one or more diodes, or any CMOS technology active or passive component.

19. The method of claim 10, wherein the thermoelectric conversion element includes at least one of a non-CMOS technology layer, such as amorphous silicon, vanadium oxide, vanadium tungsten oxide, silicon-germanium, titanium oxide, Yttrium Barium Copper Oxide, deposited during or within CMOS fabrication or after CMOS fabrication, wherein the at least one of the non-CMOS layer is fabricated in the microbolometer bridge before a metal layer or on top of the metal layers.

20. A method for manufacturing a microbolometer detector, the method comprising:
forming a Complementary Metal Oxide Semiconductor (CMOS) wafer including a substrate layer, a metal stack including at least two metal layers in contact with each other, a dielectric layer, and a thermoelectric conversion element embedded in the dielectric layer, the thermoelectric conversion element configured to convert heat into an electric signal;
etching the metal stack to define exterior lateral edges of a microbolometer bridge including at least a portion of the dielectric layer and the thermoelectric conversion element embedded in the dielectric layer; and
dry etching at least a portion of an active silicon layer or substrate layer beneath the microbolometer bridge from a front side.

21. The method of claim 20, wherein the CMOS wafer is a Silicon-on-Insulator (SOI) CMOS wafer that includes an insulating layer on top of the substrate layer and an active silicon layer on top of the insulating layer, wherein the substrate layer is a handle silicon substrate, wherein the active silicon layer is etched to form the microbolometer bridge.

22. The method of claim 21, further comprising etching the active silicon layer to form at least one pixel arm in which a conductive layer is embedded for carrying the electrical signal, and to form at least one wall structure between the microbolometer detector and an adjacent microbolometer detector to provide thermal isolation between the microbolometer detectors, the wall structure including routing metals for carrying electric signals.

23. The method of claim 21, wherein the SOI-CMOS wafer includes a DTI structure on the insulating layer and embedded in the active silicon layer beneath the microbolometer bridge so as to separate portions of the active silicon layer, and wherein etching the active silicon layer defines a base region beneath the microbolometer bridge including the DTI structure and a remaining portion of the active silicon layer with the DTI structure acting as an etch stopper.

24. The method of claim 21, wherein the insulating layer includes at least one gap and the SOI-CMOS wafer includes at least one Handle Wafer Contact (HWC) inside a corresponding gap of the at least one gap that connects the active silicon layer with the handle silicon substrate, and wherein the method further comprises etching a portion of the handle silicon substrate that is beneath the microbolometer bridge via the gap in the insulating layer.

25. The method of claim 21, wherein the SOI-CMOS wafer includes a plurality of DTI structures on the insulating layer and embedded in the active silicon layer beneath the microbolometer bridge so as to separate portions of the active silicon layer, and wherein etching the active silicon layer defines a base region beneath the microbolometer bridge including the plurality of DTI structures and at least one remaining portion of the active silicon layer with two of the DTI structures of the plurality of DTI structures acting as etch stoppers.

26. The method of claim 25, wherein at least one DTI structure of the plurality of DTI structures defines a plurality of silicon regions in the base region.

27. The method of claim 20, wherein the CMOS wafer includes a Deep Trench Isolation (DTI) structure to isolate the active silicon layer or substrate layer beneath the microbolometer from other parts of the active silicon layer.

28. The method of claim 27, wherein the DTI structure acts as a silicon etch stopper during etching of the active silicon layer.

29. The method of claim 20, wherein the metal stack includes a first metal layer and a second metal layer that is on top of the first metal layer and laterally offset from the first metal layer so that a first exterior lateral edge of the microbolometer bridge defined by etching the first metal layer is laterally closer to a center of the microbolometer bridge than a second exterior lateral edge of the microbolometer bridge defined by etching the second metal layer so as to increase a fill factor of the microbolometer detector.

30. The method of claim 20, wherein the metal stack includes a metal layer on the dielectric layer, and wherein etching the metal stack further includes etching the metal layer on the dielectric layer to define a first interior lateral edge of the microbolometer bridge that is formed by the dielectric layer and is opposite an exterior lateral edge of the microbolometer bridge so as to decrease a thermal mass and a thermal time constant of the microbolometer detector.

31. The method of claim 20, wherein the thermoelectric conversion element includes at least one of a metal layer, a metal seed layer, a polysilicon layer, a silicide layer, a silicided polysilicon layer, any CMOS technology layer, one or more transistors, one or more diodes, or any CMOS technology active or passive component.

32. The method of claim 20, wherein the thermoelectric conversion element includes at least one of a non-CMOS technology layer, such as amorphous silicon, vanadium oxide, vanadium tungsten oxide, silicon-germanium, titanium oxide, Yttrium Barium Copper Oxide, deposited during or within CMOS fabrication or after CMOS fabrication, wherein the at least one of the non-CMOS layer is fabricated in the microbolometer bridge before a metal layer or on top of the metal layers.

* * * * *